No. 818,957. PATENTED APR. 24, 1906.
F. L. HARMON.
ELASTIC VEHICLE WHEEL.
APPLICATION FILED AUG. 17, 1904.
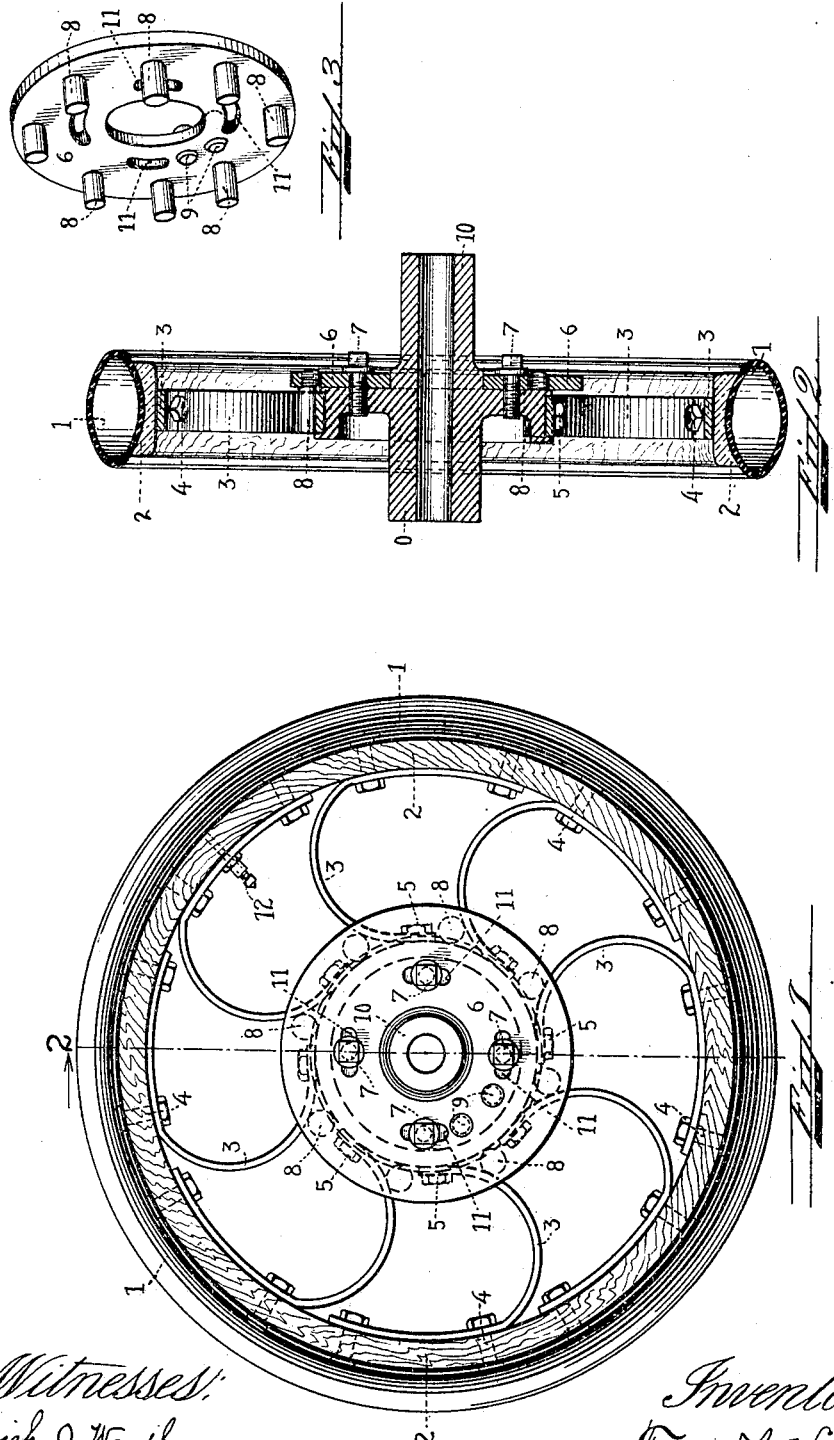

UNITED STATES PATENT OFFICE.

FRANK L. HARMON, OF BEVERLY, MASSACHUSETTS.

ELASTIC VEHICLE-WHEEL.

No. 818,957.  Specification of Letters Patent.  Patented April 24, 1906.

Application filed August 17, 1904. Serial No. 221,074.

*To all whom it may concern:*

Be it known that I, FRANK L. HARMON, a resident of Beverly, in the county of Essex and Commonwealth of Massachusetts, have invented an Elastic Vehicle-Wheel, of which this is a specification, reference being had to the accompanying drawings.

The object of my invention is to provide an elastic vehicle-wheel which on account of its elasticity may not impart much jar to the body of the vehicle and may not be liable to puncture a tire, and in order to do this I provide an elastic vehicle-wheel having spokes which are springs immovably secured at the wheel-rim and between said rim and the center of the wheel and extending out of a direct line from the center of the wheel to its rim, said wheel also having means whereby the wheel may be stiffened located between the points where the spokes are immovably secured.

In the accompanying drawings numerals are used to designate the parts.

Figure 1 is a side elevation of this new wheel; and Fig. 2 is a vertical section of it on line 2, indicated by the arrow near Fig. 1. Fig. 3 is a perspective detail of means whereupon the wheel may be properly stiffened.

The rim 2 (shown as wood) may be of metal and is provided with a hollow or pneumatic tire 1. To the rim 2 the yielding spokes 3 are secured by the bolts 4 and also to the hub 10 by the screws 5. The spokes fit in a groove shown in the periphery of said hub, as shown in Fig. 2. The long bearings of said spokes on the rim 2 are to support the rim. The ring 6 shown in Fig. 3 is shown secured to the hub 10 in Figs. 1 and 2 by the screws 7, threaded in said hub and extending through the slots 11 in said ring, and the studs 8 are shown in the V-shaped openings shown between said spokes and said hub in Fig. 1. Before the screws 7 are tightened a crow bar may be inserted between the studs 9, (shown fast in said ring 6,) and the ring may be thereby turned on the hub, so as to force all the studs against all the spokes in order to stiffen the wheel, so as to properly sustain the desired load and yield properly and prevent puncturing the tire when it violently strikes an obstacle.

Having thus shown and described my invention, I claim—

An elastic vehicle-wheel comprising spokes which are springs, one end of each spoke being immovably secured at the rim or circular part of the wheel, and the other end of each spoke being immovably secured between the rim or circular part and the center of the wheel, said spokes extending in an indirect line from the center of the wheel to said rim or circular part, and said spokes being adapted to spring in the direction that the wheel goes, and adjustable means whereby the wheel may be stiffened located between the points where said spokes are thus immovably secured.

FRANK L. HARMON.

Witnesses:
HEZEKIAH O. WOODBURY,
CASSIE L. HATFIELD.